US011836451B2

(12) United States Patent
Zhong et al.

(10) Patent No.: US 11,836,451 B2
(45) Date of Patent: Dec. 5, 2023

(54) DIALOGUE STATE TRACKING USING A GLOBAL-LOCAL ENCODER

(71) Applicant: salesforce.com, inc., San Francisco, CA (US)

(72) Inventors: Victor Zhong, Palo Alto, CA (US); Caiming Xiong, Menlo Park, CA (US)

(73) Assignee: salesforce.com, inc., San Francisco, CA (US)

(*) Notice: Subject to any disclaimer, the term of this patent is extended or adjusted under 35 U.S.C. 154(b) by 212 days.

(21) Appl. No.: 17/179,933

(22) Filed: Feb. 19, 2021

(65) Prior Publication Data

US 2021/0174028 A1 Jun. 10, 2021

Related U.S. Application Data

(63) Continuation of application No. 15/978,445, filed on May 14, 2018, now Pat. No. 10,929,607.

(Continued)

(51) Int. Cl.
*G06F 40/30* (2020.01)
*G06N 3/08* (2023.01)
(Continued)

(52) U.S. Cl.
CPC ............ *G06F 40/30* (2020.01); *G06N 3/044* (2023.01); *G06N 3/045* (2023.01); *G06N 3/08* (2013.01); *G06N 3/084* (2013.01); *G06N 5/022* (2013.01)

(58) Field of Classification Search
CPC ...... G06N 3/0445; G06N 3/0454; G06N 3/08; G06N 3/084; G06F 40/30
See application file for complete search history.

(56) References Cited

U.S. PATENT DOCUMENTS 6,075,884 A * 6/2000 Lubin .................. H04N 19/192
375/E7.14
10,282,663 B2 5/2019 Socher et al.
(Continued)

FOREIGN PATENT DOCUMENTS

WO WO-9739417 A2 * 10/1997 ............... G06K 9/66

OTHER PUBLICATIONS

Li, Linghui, et al. "GLA: Global-local attention for image description." IEEE Transactions on Multimedia 20.3 (2017): 726-737. (Year: 2017).*

(Continued)

*Primary Examiner* — Daniel C Washburn
*Assistant Examiner* — Oluwadamilola M Ogunbiyi
(74) *Attorney, Agent, or Firm* — HAYNES AND BOONE

(57) ABSTRACT

A method for maintaining a dialogue state associated with a dialogue between a user and a digital system includes receiving, by a dialogue state tracker associated with the digital system, a representation of a user communication, updating, by the dialogue state tracker, the dialogue state and providing a system response based on the updated dialogue state. The dialogue state is updated by evaluating, based on the representation of the user communication, a plurality of member scores corresponding to a plurality of ontology members of an ontology set, and selecting, based on the plurality of member scores, zero or more of the plurality of ontology members to add to or remove from the dialogue state. The dialogue state tracker includes a global-local encoder that includes a global branch and a local branch, the global branch having global trained parameters that are shared among the plurality of ontology members and the local branch having local trained parameters that are determined separately for each of the plurality of ontology members.

20 Claims, 9 Drawing Sheets

Related U.S. Application Data

(60) Provisional application No. 62/634,130, filed on Feb. 22, 2018.

(51) Int. Cl.
  *G06N 5/022* (2023.01)
  *G06N 3/084* (2023.01)
  *G06N 3/044* (2023.01)
  *G06N 3/045* (2023.01)

(56) References Cited

U.S. PATENT DOCUMENTS

| | | | |
|---|---|---|---|
| 10,346,721 B2 | 7/2019 | Albright et al. | |
| 10,878,808 B1* | 12/2020 | Mathias | G10L 15/22 |
| 10,929,607 B2 | 2/2021 | Zhong et al. | |
| 2003/0079039 A1 | 4/2003 | Forkner et al. | |
| 2007/0288734 A1* | 12/2007 | Luick | G06F 9/3824 |
| | | | 712/237 |
| 2009/0313328 A1 | 12/2009 | Reistad et al. | |
| 2012/0053945 A1 | 3/2012 | Gupta et al. | |
| 2013/0013301 A1 | 1/2013 | Subbaraman et al. | |
| 2014/0064155 A1 | 3/2014 | Evans | |
| 2016/0163311 A1 | 6/2016 | Crook et al. | |
| 2016/0350653 A1 | 12/2016 | Socher et al. | |
| 2017/0024645 A1 | 1/2017 | Socher et al. | |
| 2017/0032280 A1 | 2/2017 | Socher | |
| 2017/0140240 A1 | 5/2017 | Socher | |
| 2017/0228366 A1 | 8/2017 | Bui et al. | |
| 2017/0262995 A1* | 9/2017 | Li | G06T 7/33 |
| 2017/0287478 A1 | 10/2017 | Schulz et al. | |
| 2018/0082171 A1 | 3/2018 | Merity et al. | |
| 2018/0096219 A1 | 4/2018 | Socher | |
| 2018/0096267 A1 | 4/2018 | Masekera et al. | |
| 2018/0121415 A1 | 5/2018 | Perez et al. | |
| 2018/0121787 A1 | 5/2018 | Hashimoto et al. | |
| 2018/0121788 A1 | 5/2018 | Hashimoto et al. | |
| 2018/0121799 A1 | 5/2018 | Hashimoto et al. | |
| 2018/0129931 A1 | 5/2018 | Bradbury et al. | |
| 2018/0129937 A1 | 5/2018 | Bradbury et al. | |
| 2018/0129938 A1 | 5/2018 | Xiong et al. | |
| 2018/0137854 A1 | 5/2018 | Perez | |
| 2018/0143966 A1 | 5/2018 | Lu et al. | |
| 2018/0144208 A1 | 5/2018 | Lu et al. | |
| 2018/0144248 A1 | 5/2018 | Lu et al. | |
| 2018/0232435 A1 | 8/2018 | Papangelis et al. | |
| 2018/0268287 A1 | 9/2018 | Johansen et al. | |
| 2018/0268298 A1 | 9/2018 | Johansen et al. | |
| 2018/0300317 A1 | 10/2018 | Bradbury | |
| 2018/0300400 A1 | 10/2018 | Paulus | |
| 2018/0314689 A1 | 11/2018 | Wang et al. | |
| 2018/0330721 A1 | 11/2018 | Thomson et al. | |
| 2018/0336198 A1 | 11/2018 | Zhong et al. | |
| 2018/0336453 A1 | 11/2018 | Merity et al. | |
| 2018/0373704 A1 | 12/2018 | Lee et al. | |
| 2019/0098039 A1* | 3/2019 | Gates | G16H 20/70 |
| 2019/0102908 A1 | 4/2019 | Yang et al. | |
| 2019/0108432 A1 | 4/2019 | Lu et al. | |
| 2019/0108439 A1 | 4/2019 | Lu et al. | |
| 2019/0115027 A1 | 4/2019 | Shah et al. | |
| 2019/0130206 A1 | 5/2019 | Trott et al. | |
| 2019/0130213 A1 | 5/2019 | Shazeer et al. | |
| 2019/0130248 A1 | 5/2019 | Zhong et al. | |
| 2019/0130249 A1 | 5/2019 | Bradbury et al. | |
| 2019/0130273 A1 | 5/2019 | Keskar et al. | |
| 2019/0130312 A1 | 5/2019 | Xiong et al. | |
| 2019/0130896 A1 | 5/2019 | Zhou et al. | |
| 2019/0130897 A1 | 5/2019 | Zhou et al. | |
| 2019/0149834 A1 | 5/2019 | Zhou et al. | |
| 2019/0156210 A1 | 5/2019 | He et al. | |
| 2019/0172466 A1* | 6/2019 | Lee | G06F 40/284 |
| 2019/0188568 A1 | 6/2019 | Keskar et al. | |
| 2019/0236464 A1* | 8/2019 | Feinson | G06N 5/04 |
| 2019/0251168 A1 | 8/2019 | McCann et al. | |
| 2019/0251431 A1 | 8/2019 | Keskar et al. | |
| 2019/0258714 A1 | 8/2019 | Zhong et al. | |
| 2019/0332919 A1 | 10/2019 | Weiss et al. | |
| 2020/0110915 A1 | 4/2020 | Long et al. | |
| 2020/0250491 A1* | 8/2020 | Peng | G06V 10/764 |
| 2020/0250497 A1* | 8/2020 | Peng | G06K 9/6289 |
| 2020/0251098 A1 | 8/2020 | Metallinou et al. | |
| 2020/0410344 A1* | 12/2020 | Kaiser | G06N 3/084 |

OTHER PUBLICATIONS

Zhu, Yousong, et al. "Couplenet: Coupling global structure with local parts for object detection." Proceedings of the IEEE international conference on computer vision. 2017. (Year: 2017).*

Bahdanau et al., "Neural Machine Translation by Jointly Learning to Align and Translate," Published as a Conference Paper at International Conference on Learning Representations (ICLR) 2015. arXiv:1409.0473v7. pp. 1-15.

Bonilla et al., "Mulit-task Gaussian Process Prediction," In Advances in Neural Information Processing. School of Informatics, University of Edinburgh, 5 Forrest Hill, Edinburgh. Jan. 1, 2008. pp. 1-8.

Caruana et al., "Multitask Learning," In Learning to Learn. Kluwer Academic Publishers. School of Computer Science, Carnegie Mellon University, Pittsburgh, PA. Jan. 1, 1997. pp. 1-35.

Cheng et al., "Long Short-Term Memory-Networks for Machine Reading," Published as Conference Paper at Empirical Methods in Natural Language Processing (EMNLP). School of Informatics, University of Edinburgh. Sep. 20, 2016. pp. 1-11.

Ganitkevitch et al., "PPDB: The Paraphrase Database," Proceedings of the North American Chapter of the Association for Computational Linguistics: Human Language Technologies (NAACL-HLT). Atlanta, Georgia. Jun. 9-14, 2013. pp. 1-7.

Hashimoto et al., "A Joint Many-Task Model: Growing a Neural Network for Multiple NLP Tasks," Conference on Empirical Methods in Natural Language Processing (EMNLP). The University of Tokyo. Nov. 5, 2016. pp. 1-15.

Henderson et al., "Discriminative Spoken Language Understanding Using Word Confusion Networks," In Spoken Language Technology Workshop (SLT), IEEE. Engineering Department, Cambridge University, CB2 1PZ, UK. Jan. 1, 2012. pp. 1-6.

Henderson et al., "The Second Dialog State Tracking Challenge," Proceedings of the Special Interest Group on Discourse and Dialogue (SIGDIAL) 2014 Conference. Philadelphia, USA. Association for Computational Linguistics. Jun. 18-20, 2014. pp. 1-10.

Henderson et al., "Word-Based Dialog State Tracking with Recurrent Neural Networks," Proceedings of the Special Interest Group on Discourse and Dialogue (SIGDIAL) 2014 Conference. Philadelphia, USA. Association for Computational Linguistics. Jun. 18-20, 2014. pp. 1-8.

Hochreiter et al., "Long Short-Term Memory: Neural Computation," Neural Computation, vol. 9, Issue 8. Nov. 15, 1997. pp. 1-32.

Johnson et al., "Google's Multilingual Neural Machine Translation System: Enabling Zero-Shot Translation," Transactions of the Association for Computational Linguistics, vol. 5. Association for Computational Linguistics. Oct. 1, 2017. pp. 1-14.

Kaiser et al., "One Model to Learn Them All," Published as eprint, arXiv:1706.05137. https://arxiv.org/pdf/1706.05137.pdf. Jun. 16, 2017. pp. 1-10.

Kingma et al., "Adam: A Method for Stochastic Optimization," Published as a Conference paper at the International Conference on Learning Representations (ICLR). https://arxiv.org/abs/1412.6980v1. Dec. 22, 2014. pp. 1-15.

Lawrence et al., "Learning to Learn with the Informative Vector Machine," Appearing in the Proceedings of the 21st International Conference on Machine Learning. Banff, Canada. Jan. 1, 2004. pp. 1-8.

Lu et al., "Hierarchical Question-Image Co-Attention for Visual Question Answering," 30th Conference on Neural Information Processing Systems (NIPS). Barcelona, Spain. Jan. 1, 2016. pp. 1-9.

Luong et al., "Effective Approaches to Attention-Based Neural Machine Translation," Proceedings of the 2015 Conference on Empirical Methods in Natural Language Processing. Lisbon, Portugal. Sep. 17-21, 2015. pp. 1-10.

(56) References Cited

OTHER PUBLICATIONS

Mrksic et al., "Multi-domain Dialog State Tracking Using Recurrent Neural Networks," Accepted as a short paper in the 53rd Annual Meeting of the Association for Computational Linguistics (ACL 2015). University of Cambridge, UK. Jun. 23, 2015. pp. 1-6.

Mrksic et al., "Neural Belief Tracker: Data-Driven Dialogue State Tracking," Accepted as a long paper for the 55th Annual Meeting of the Association for Computational Linguistics (ACL 2017). Jun. 1, 2016. pp. 1-12.

Paulus et al., "A Deep Reinforced Model for Abstractive Summarization," arxiv preprint arxiv:1705.04304. https://arxiv.org/abs/1705.04304. Nov. 16, 2017. pp. 1-12.

Pennington et al., "GloVe: Global Vectors for Word Representation," Proceedings of the 2014 Conference on Empirical Methods in Natural Language Processing (EMNLP). Doha, Qatar. Oct. 25-29, 2014. pp. 1-12.

Perez et al., "Dialog State Tracking, A Machine Reading Approach Using Memory Network," Proceedings of the 15th Conference of the European Chapter of the Association for Computational Linguistics: vol. 1. Valencia, Spain. Apr. 3-7, 2017. pp. 1-10.

See et al., "Get To The Point: Summarization with Pointer-Generator Networks," Proceedings of the 55th Annual Meeting of the Association for Computational Linguistics, vol. 1: Long Papers. http://aclweb.org/anthology/P17-1099. Apr. 14, 2017. pp. 1-20.

Seeger et al., "Semiparametric Latent Factor Models," Proceedings of the 10th International Workshop on Artificial Intelligence and Statistics (AISTATS). Division of Computer Science, University of California, Berkeley. Mar. 2, 2005. pp. 1-31.

Seo et al., "Bidirectional Attention Flow for Machine Comprehension," Published as a Conference Paper at the International Conference on Learning Representations (ICLR). Feb. 24, 2017. pp. 1-13.

Srivastava et al., "Dropout: A Simple Way to Prevent Neural Networks from Overfitting," Journal of Machine Learning Research. University of Toronto. Jun. 14, 2014. pp. 1-30.

Thomson et al., "Bayesian Update of Dialogue State: A POMPD Framework for Spoken Dialogue Systems," Published in Intenational Conference on Acoustics, Speech and Signal Processing (ICASSP) 2008, IEEE. University of Cambridge, Engineering Department, Cambridge CB2 1TP, United Kingdom. Oct. 8, 2008. pp. 1-27.

Thrun, "Is Learning the N-Th Thing any Easier Than Learning the First," In Advances in Neural Information Processing Systems. Computer Science Department, Carnegie Mellon University, Pittsburgh, PA. Jan. 1, 1996. pp. 1-7.

Vaswani et al., "Attention Is All You Need," 31st Conference on Neural Information Processing Systems (NIPS 2017), Long Beach, CA, USA. https://arxiv.org/abs/1706.03762. arXiv:1706.03762. Jun. 12, 2017. pp. 1- 15.

Wang et al., "A Simple and Generic Belief Tracking Mechanism for the Dialog State Tracking Challenge: On the Believability of Observed Information," Proceedings of the Special Interest Group on Discourse and Dialogue (SIGDIAL) Conference. Metz, France. Aug. 22-24, 2013. pp. 1-10.

Wen et al., "A Network-based End to End Trainable Task Oriented Dialogue System," Published at The European Chapter of the Association for Computational Linguistics (EACL). Cambridge University Engineering Department, Trumpington Street, Cambridge, CB2 1PZ, UK. Apr. 24, 2017. pp. 1-12.

Wieting et al., "From Paraphrase Database to Compositional Paraphrase Model and Back," Transactions of the Association for Computational Linguistics, vol. 3. Jan. 1, 2015. pp. 1-14.

Williams et al., "Partially Observable Markov Decision Processes for Spoken Dialog Systems," Computer Speech and Language. AT&T Labs—Research. Jan. 1, 2007. pp. 1-44.

Williams et al., "The Dialog State Tracking Challenge," Proceedings of the Special Interest Group on Discourse and Dialogue (SIGDIAL) Conference. Metz, France. Aug. 22-24, 2013. pp. 1-10.

Williams et al., "Web-Style Ranking and SLU Combination for Dialog State Tracking," Proceedings of the Special Interest Group on Discourse and Dialogue (SIGDIAL) Conference. Philadelphia, PA. Jun. 18-20, 2014. pp. 1-10.

Xiong et al., "Dynamic Coattention Networks for Question Answering," Published as a Conference Paper at International Conference on Learning Representations (ICLR). XP055447075. Mar. 6, 2018. pp. 1-14.

Young et al., "POMDP-Based Statistical Spoken Dialogue Systems: A Review," Proceedings of the IEEE, vol. 101, No. 5. Jan. 1, 2013. pp. 1-18.

Yu et al., "Learning Gaussian Processes from Multiple Tasks," Appearing in Proceedings of the 22nd International Conference on Machine Learning. Bonn, Germany. Jan. 1, 2005. pp. 1-8.

Zilka et al., "Incremental LSTM-Based Dialog State Tracker," In Automatic Speech Recognition and Understanding (ASRU), 2015 IEEE Workshop on IEEE. Jul. 13, 2015. pp. 1-6.

Hori et al., "Dialog State Tracking With Attention-Based Sequence-To-Sequence Learning", 2016 IEEE Spoken Language Technology Workshop (SLT), San Diego, CA, 2016, pp. 552-558.

International Search Report and Written Opinion for PCT/US2019/018014, dated Jun. 4, 2019, pp. 1-19.

Henderson, "Machine Learning for Dialog State Tracking: A Review," in International Conference on Acoustics, Speech, and Signal Processing 2010 IEEE, Dec. 3, 2015, pp. 1-8.

Rastogi et al., "Scalable Multi-Domain Dialogue State Tracking," 2017 IEEE Automatic Speech Recognition and Understanding Workshop (ASRU), IEEE, Dec. 16, 2017, pp. 561-568.

Shi et al., "Convolutional Neural Networks for Multi-topic Dialog State Tracking," in International Conference on Future Information Technology; International Conference on Multimedia and Ubiquitous Engineering; FutureTech 2017, MUE 017: Advanced Multimedia and Ubiquitous Engineering, May 22-24, 2017 in Seoul, South Korea; in Lecture Notes in Electrical Engineering; ISSN 1876-1100; Dec. 25, 2016, Springer Netherlands, vol. 427, pp. 451-463.

* cited by examiner

| Exchange | User Communication | Context (Previous Actions) | Updates to Dialogue State | Response Dialogue |
|---|---|---|---|---|
| 1 | Where would you go to eat in the south part of town? | N/A | Inform(area=south) | Ok I can help with that. Are your looking for a particular type of food, or within a specific price range? |
| 2 | I just want to eat at a cheap restaurant in the south part of town. What food types are available, can you also provide some phone numbers? | Request(food) Request(price range) | Inform(price range=cheap) Inform(area=south) Request(phone) Request(food) | I found two restaurants serving cheap food. Would you prefer Portuguese or Chinese food? |
| 3 | Either is fine, can I have the phone number please? | Request(food) | Request(phone) | The lucky start is at 01223244277 and Nandos is at 01223327908 |
| 4 | Thank you very much. | N/A | N/A | N/A |

FIG. 1B

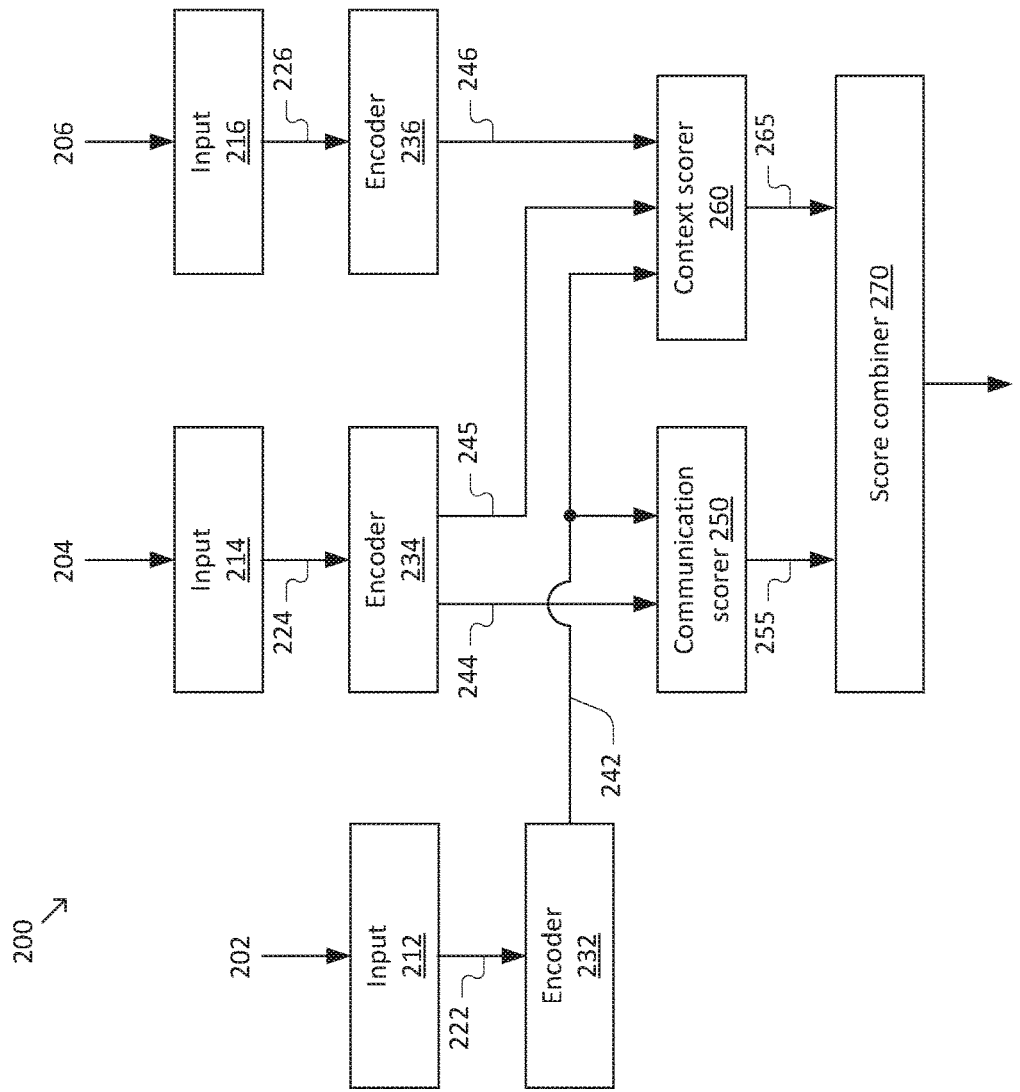

810

| Model | DSTC2 | | WOZ | |
|---|---|---|---|---|
| | Cumul. goal | Turn request | Cumul. goal | Turn request |
| Delexicalisation-Based Model | 69.1% | 95.7% | 70.8% | 87.1% |
| Delex. Model + Semantic Dictionary | 72.9% | 95.7% | 83.7% | 87.6% |
| Neural Belief Tracker - DNN | 72.6% | 96.4% | 84.4% | 91.2% |
| Neural Belief Tracker - CNN | 73.4% | 96.5% | 84.2% | 91.6% |
| Attentive Dialogue State Tracker | 74.7% | 97.3% | 88.3% | 96.4% |

| Model | Cumulative goal | Turn request |
|---|---|---|
| Attentive Dialogue State Tracker | 88.8% | 97.3% |
| - global modules (no sharing) | 73.4% | 97.3% |
| - slot-specific modules (single model) | 86.6% | 95.1% |
| - self attention | 84.4% | 97.1% |
| - LSTM | 71.5% | 93.2% |

FIG. 8B

DIALOGUE STATE TRACKING USING A GLOBAL-LOCAL ENCODER

RELATED APPLICATIONS

This application claims the benefit of the U.S. patent application Ser. No. 15/978,445, filed on May 14, 2018, which claims the benefit of the U.S. Provisional Patent Application No. 62/634,130, filed Feb. 22, 2018 and entitled "Dialogue State Tracking Using A Neural Network Model", which is incorporated by reference in its entirety.

TECHNICAL FIELD

Embodiments of the present disclosure relate generally to dialogue state tracking and more particularly to dialogue state tracking using a global-local encoder.

BACKGROUND

Neural networks have demonstrated great promise as a technique for automatically analyzing real-world information with human-like accuracy. In general, neural network models receive input information and make predictions based on the input information. For example, a neural network classifier may predict a class of the input information among a predetermined set of classes. Whereas other approaches to analyzing real-world information may involve hard-coded processes, statistical analysis, and/or the like, neural networks learn to make predictions gradually, by a process of trial and error, using a machine learning process. A given neural network model may be trained using a large number of training examples, proceeding iteratively until the neural network model begins to consistently make similar inferences from the training examples that a human might make. Neural network models have been shown to outperform and/or have the potential to outperform other computing techniques in a number of applications. Indeed, some applications have even been identified in which neural networking models exceed human-level performance.

BRIEF DESCRIPTION OF THE DRAWINGS

FIG. 1B is a simplified diagram of an example dialogue between a user and the digital system according to some embodiments.

FIGS. 2A-2C are simplified diagrams of a scoring model according to some embodiments.

FIGS. 8A and 8B are simplified diagrams of an experimental evaluation of a dialogue state tracker according to some embodiments.

DETAILED DESCRIPTION

Dialogue state tracking is one class of problems to which neural networks may be applied. In dialogue state tracking applications, a user engages in a dialogue with an interactive digital system, such as a digital assistant, chatbot, a task-oriented dialogue system (e.g., a restaurant reservation system), and/or the like. To keep track of various objectives expressed by the user and/or responsive actions taken by the digital system over the course of the dialogue, the digital system includes or is associated with a dialogue state tracker that maintains a dialogue state associated with the dialogue. In particular, the dialogue state tracker may include a neural network model for updating the dialogue state at each exchange of the dialogue. For example, suppose a user asks the digital system "Find me a good restaurant on the south side of town." Suppose further that the digital system replies "Cheap or expensive?" to which the user replies "Cheap. Can you give me the phone number?" In this scenario, the dialogue state tracker should maintain a comprehensive representation of the dialogue state that is cumulative of the dialogue up to that point (e.g., the user has requested a phone number of a restaurant that is cheap and on the south side of town).

The performance of dialogue state trackers may be compared or benchmarked by testing different models on a shared dataset, such as, for example, a dataset from the Dialogue System Technology Challenges (DSTC) series of shared tasks. Illustrative examples of tasks that adhere to the DTSC framework include the Wizard of Oz (WoZ) restaurant reservation task and the DSTC2 task. The accuracy of each model may be measured by evaluating one or more metrics, such as cumulative goal accuracy (e.g., the percentage of user goals correctly identified, determined cumulatively over the exchanges in a dialogue), turn request accuracy (the percentage of user requests correctly identified in a given exchanges of the dialogue), and/or the like. State of art dialogue state trackers achieve less than or equal to 73.4% cumulative goal accuracy and less than or equal to 96.6% turn request accuracy on DSTC2, and less than or equal to 84.4% cumulative goal accuracy and less than or equal to 91.6% turn request accuracy on WoZ. Accordingly, it is desirable to develop neural network models for dialogue state trackers that achieve higher accuracy than current state of art dialogue state trackers.

Figure 1A:
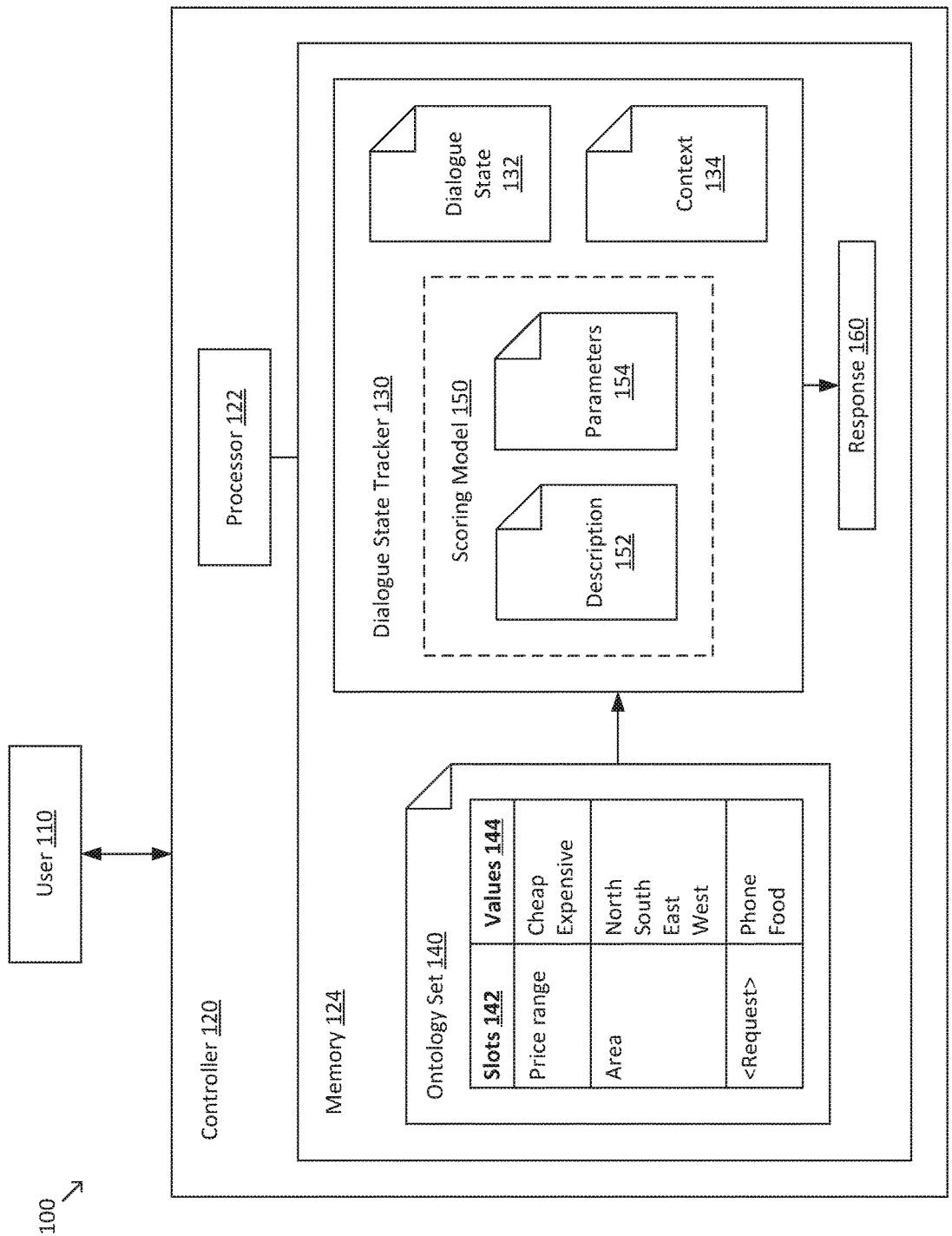
FIG. 1A is a simplified diagram of a digital system with dialogue state tracking according to some embodiments.

FIG. 1A is a simplified diagram of a digital system 100 with dialogue state tracking according to some embodiments. According to some embodiments, a user 110 may engage in a dialogue with digital system 100. For example, user 110 may communicate with digital system 100 using any suitable form of communication, including verbal communication (e.g., spoken utterances), written communication (e.g., alphanumeric text and/or symbols), visual communication (e.g., gestures), and/or the like. In response, digital system 100 may provide one or more system responses (e.g., providing a response dialogue to user 110, performing a task on behalf of user 110, requesting additional information, and/or the like).

As depicted in FIG. 1A, digital system 100 includes a controller 120 communicatively coupled to user 110 and/or a user device of user 110. For example, user 110 may access controller 120 via a network. In some embodiments, controller 120 may include a processor 122 (e.g., one or more hardware processors). Although processor 122 may include one or more general purpose central processing units (CPUs), processor 122 may additionally or alternately include at least one processor that provides accelerated performance when evaluating neural network models. For example, processor 122 may include a graphics processing unit (GPU), an application specific integrated circuit (ASIC), a field programmable gate array (FPGA), a tensor processing unit (TPU), a digital signal processor (DSP), a single-instruction multiple-data (SIMD) processor, and/or the like. Generally, such processors may accelerate various computing tasks associated with evaluating neural network models (e.g., training, prediction, preprocessing, and/or the like) by an order of magnitude or more in comparison to a general purpose CPU.

Controller 120 may further include a memory 124 (e.g., one or more non-transitory memories). Memory 124 may include various types of short-term and/or long-term storage modules including cache memory, static random access memory (SRAM), dynamic random access memory (DRAM), non-volatile memory (NVM), flash memory, solid state drives (SSD), hard disk drives (HDD), optical storage media, magnetic tape, and/or the like. In some embodiments, memory 124 may store instructions that are executable by processor 122 to cause processor 122 to perform operations corresponding to processes disclosed herein and described in more detail below.

Processor 122 and/or memory 124 may be arranged in any suitable physical arrangement. In some embodiments, processor 122 and/or memory 124 may be implemented on a same board, in a same package (e.g., system-in-package), on a same chip (e.g., system-on-chip), and/or the like. In some embodiments, processor 122 and/or memory 124 may include distributed, virtualized, and/or containerized computing resources. Consistent with such embodiments, processor 122 and/or memory 124 may be located in one or more data centers and/or cloud computing facilities.

In some embodiments, memory 124 may store a dialogue state tracker 130 that maintains a dialogue state 132. At each exchange of the dialogue (e.g., at each communication received from user 110 and/or system response provided by digital system 100), dialogue state tracker 130 may update dialogue state 132. For example, dialogue state 132 may be updated to include one or more goals and/or requests expressed by user 110 over the course of the dialogue. Additionally or alternately, dialogue state tracker 130 may maintain a context 134. For example, context 134 may include a history of one or more previous system responses by digital system 100 (e.g., previous actions taken), which provide context for a current communication received from user 110.

In some embodiments, memory 124 may store an ontology set 140 that defines the range of user goals and/or requests that digital system 100 is equipped to handle. In some embodiments, ontology set 140 may include a plurality of ontology members, which are illustratively depicted in FIG. 1A as pairs of slots 142 and corresponding values 144. As depicted in FIG. 1A, slots 142 and values 144 are populated with illustrative examples corresponding to a scenario in which digital system 100 corresponds to a restaurant reservation system. In particular, slots 142 include two goal slots labeled "price range" and "area," respectively. Values 144 corresponding to "price range" include "cheap" and "expensive." Values 144 corresponding to "area" include "North," "South," "East," and "West." That is, user 110 may specify the price range and/or geographic area of restaurants at which digital system 100 may consider making a reservation. Slots 142 further include a pseudo-slot labeled "<request>," which may be used to handle user requests. Values 144 corresponding to "<request>" include "phone" and "food." That is, user 110 may request that digital system 100 provide a phone number and/or a type of cuisine for a restaurant. It is to be understood that these are merely examples, and that ontology set 140 may support a wide range of user goals and/or requests, which may be tailored to a particular application (e.g., restaurant reservations) and/or to a general-purpose application.

At each exchange of the dialogue, dialogue state tracker 130 may determine zero or more ontology members (e.g., pairs of slots and values from ontology set 140) to add to dialogue state 132. For example, when user 110 expresses a desire to find a cheap restaurant, dialogue state tracker 130 may add the slot-value pair "price range=cheap" to dialogue state 132. Similarly, dialogue state tracker 130 may determine zero or more ontology members to remove or replace in dialogue state 132. For example, dialogue state tracker 130 may replace the slot-value pair "price range=expensive" with "price range=cheap" if user 110 previously expressed a desire for an expensive restaurant, but then changed the preference to a cheap restaurant.

To determine which ontology members (e.g., slot-value pairs from ontology set 140) to add to or remove from dialogue state 132 at a given exchange, dialogue state tracker 130 may include a scoring model 150 for evaluating member scores corresponding to the ontology members. Scoring model 150 may correspond to a neural network model that is evaluated by processor 122. In particular, scoring model 150 may include a plurality of neural network layers. Examples of neural network layers include densely connected layers, convolutional layers, recurrent layers, pooling layers, dropout layers, and/or the like. In some embodiments, scoring model 150 may include at least one hidden layer that is not directly connected to either an input or an output of the neural network. Scoring model 150 may further include a plurality of model parameters (e.g., weights and/or biases) that are learned according to a machine learning process. Examples of machine learning processes include supervised learning, reinforcement learning, unsupervised learning, and/or the like. Embodiments of scoring model 150 are described in further detail below with reference to FIGS. 2A-7.

Scoring model 150 may be stored in memory 124 using any number of files and/or data structures. As depicted in FIG. 1, scoring model 150 includes a model description 152 that defines a computational graph of scoring model 150 (e.g., a sequence of neural network layers) and model parameters 154 that store parameters of scoring model 150 (e.g., weights and/or biases). In general, model description 152 and/or model parameters 154 may store information associated with scoring model 150 in any suitable format, including but not limited to structured, unstructured, serialized, and/or database formats.

In some embodiments, memory 124 may store a response module 160 that determines zero or more system responses to provide or perform in response to a given user communication based, at least in part, on dialogue state 132. Examples of system responses include generating and sending a response dialogue to user 110, performing a task on behalf of user 110, requesting additional information from user 110, and/or the like. In some embodiments, response module 160 may record the system response at a given exchange, e.g., by updating context 134. In this manner, context 134 may provide context information to dialogue state tracker 130 based on previous actions taken by digital system 100.

FIG. 1B is a simplified diagram of an example dialogue 170 between user 110 and digital system 100 according to some embodiments. Example dialogue 170 generally corresponds to a dialogue from the WoZ restaurant reservation task. The columns depicted in FIG. 1B include an user communication column indicating an utterance or communication by user 110 at a given exchange, a context column that indicates any actions taken during the previous exchange by digital system 100 that are recorded in context 134, updates to dialogue state 132 determined by dialogue state tracker 130 at a given exchange, and a response dialogue generated by response module 160 at a given exchange.

During the first exchange, the user states "Where would you go to eat in the south part of town?" Because this is the first exchange, there are no previous actions included in context 134. Dialogue state tracker 130 determines that the user communication matches the slot-value pair "area=south" from ontology set 140, which is represented as "Inform(area=south)" in dialogue state 132 to indicate that the slot-value pair corresponds to a user goal (as opposed to a user request). Digital system 100 responds "Ok I can help with that. Are your looking for a particular type of food, or within a specific price range?"

During the second exchange, the user states "I just want to eat at a cheap restaurant in the south part of town. What food types are available, can you also provide some phone numbers?" Context 134 indicates that during the previous exchange, digital system 100 requested that user 110 provide a food type ("Request(food)") and a price range ("Request (price range"). Dialogue state tracker 130 determines that the user communication matches the slot-value pairs "price range=cheap," "area=south," "<request>=phone," and "<request>=food" from ontology set 140. The matching values from the "<request>" slot are represented as "Request (value)" in dialogue state 132 to indicate that the slot-value pair corresponds to a user request (as opposed to a user goal). Digital system 100 responds "I found two restaurants serving cheap food. Would you prefer Portuguese or Chinese food?"

During the third exchange, the user states "Either is fine, can I have the phone number please?" Context 134 indicates that during the previous exchange, digital system 100 requested that user 110 provide a food type ("Request(food)"). Dialogue state tracker 130 determines that the user communication matches the slot-value pair "<request>=phone" from ontology set 140. Digital system 100 responds by providing the phone number for two restaurants that satisfy the criteria expressed by the user (i.e., cheap and located in the south part of town): "The lucky start is at 01223244277 and Nandos is at 01223327908." The dialogue ends when user 110 replies "Thank you very much."

Figure 2C:
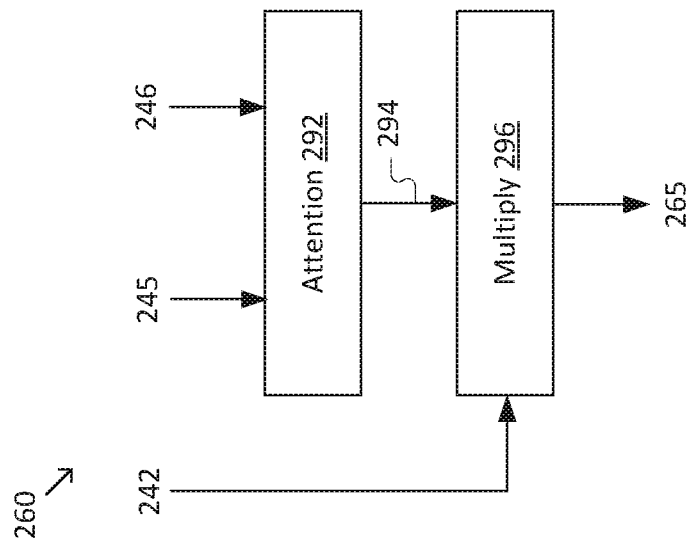
Figure 2B:
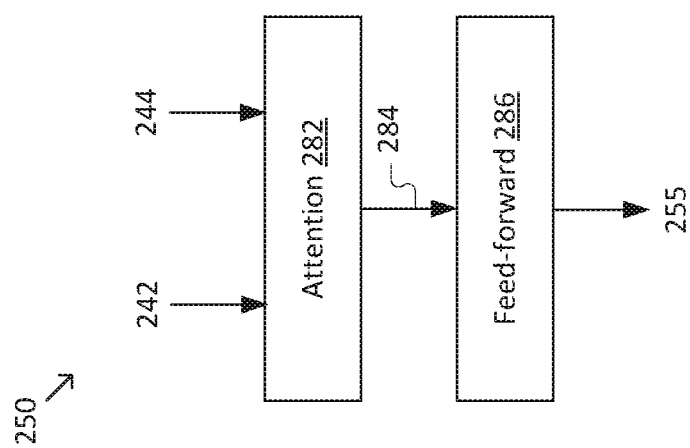

FIGS. 2A-2C are simplified diagrams of a scoring model 200 according to some embodiments. According to some embodiments consistent with FIG. 1, scoring model 200 may be used to implement scoring model 150. As depicted in FIGS. 2A-2C, scoring model 200 generally includes features similar to those described in "Neural Belief Tracker: Data-Driven Dialogue State Tracking," to Mrkšić et al., published April 2017, which is hereby incorporated by reference in its entirety.

In some embodiments, scoring model 200 may receive an ontology member sequence 202, a user communication sequence 204, and zero or more context sequences 206 and generate a member score 208 corresponding to the received ontology member sequence 202. In some embodiments, ontology member sequence 202 may correspond to a sequence of text representing a slot value and/or a slot-value pair of an ontology set, such as "cheap," "price range=cheap," and/or "Inform(price range=cheap)," from example dialogue 170. In some embodiments, user communication sequence 204 may correspond to a sequence of text representing a user communication, such as "Where would you go to eat in the south part of town?" from example dialogue 170. In some embodiments, context sequences 206 may include zero or more sequences of text that provide context associated with user communication sequence 204. For example, context sequences 206 may correspond to text representations of previous actions taken by digital system 100, such as "request(food)" and "request(price range)" from example dialogue 170.

Member score 208 generally reflects the likelihood that the user communication under consideration matches or invokes the ontology member that is currently being evaluated (e.g., whether the user does in fact desire to find a restaurant in the "cheap" price range). Member score 208 may correspond to a numerical score, a ranking, a label (e.g., "high"/"low"), a grouping, a selection, and/or the like. In some embodiments, scoring model 200 may be evaluated (e.g., in parallel and/or in a serial manner) for each ontology member in an ontology set, such as ontology set 140, yielding a set of member scores. Based on the set of member scores, a dialogue state tracker, such as dialogue state tracker 130, may update the dialogue state, such as dialogue state 132. For example, ontology members that are assigned member scores above a first threshold value may be added to the dialogue state, and ontology members with member scores below a second threshold value may be removed from the dialogue state.

Scoring model 200 may include input stages 212, 214, and 216 that receive ontology member sequence 202, user communication sequence 204, and context sequences 206, respectively, and generate input representations 222, 224, and 226, respectively. In some embodiments, input representations 222, 224, and 226 may correspond to vector representations of sequences 202, 204, and 206, respectively. For example, when sequences 202, 204, and/or 206 correspond to text sequences, input stages 212, 214, and/or 216 may generate the corresponding vector representations by (1) tokenizing the text sequences and (2) embedding the tokenized text sequences in a vector space. Tokenizing the text sequences may include identifying tokens within the text sequences, where examples of tokens include characters, character n-grams, words, word n-grams, lemmas, phrases (e.g., noun phrases), sentences, paragraphs, and/or the like. Embedding the tokenized text sequences may include mapping each token to a vector representation in a multidimensional vector space. For example, a token corresponding to a word may be mapped to a 300-dimensional GloVe vector representation.

Scoring model 200 may further include encoder stages 232, 234, and 236 that receive input representations 222, 224, and 226, respectively, and generates one or more encoded representations 242, 244, 245, and/or 246. Illustrative embodiments of encoder stages 232, 234, and/or 236 are described in greater detail below with reference to FIGS. 3 and 4.

Scoring model 200 may further include a user communication scoring stage 250 that generates a user communication score 255 based on encoded representations 242 and 244. FIG. 2B depicts an illustrative embodiment of user communication scorer stage 250. As depicted in FIG. 2B, user communication scoring stage 250 may include an attention layer 282 that generates an attended representation 284 based on encoded representations 242 and 244. In particular, attended representation 284 may be generated by attending over a representation of the user communication (e.g., encoded representation 244) using a representation of the ontology member currently being evaluated (e.g., encoded representation 242). For example, attended representation 284 may be determined by evaluating the following equation:

$$q^{utt} = \sum_i p_i^{utt} c_i^{utt}$$

Where $q^{utt}$ denotes attended representation 284; $c_i^{utt}$ denotes the ith value of encoded representation 244; $p_i^{utt}$ is defined as softmax($s^{utt}$); the ith value of $s^{utt}$ is defined as $s_i^{utt} = c_i^{utt} \cdot c_j^{val}$; and $c_j^{val}$ denotes the jth value of encoded representation 242.

User communication scoring stage 250 may further include a feed-forward layer 286 that generates user communication score 255 based on attended representation 284. For example, user communication score 255 may be determined by evaluating the following equation:

$$y^{utt} = W^{utt} q^{utt} + b^{utt}$$

Where $y^{utt}$ denotes user communication score 255, $W^{utt}$ denotes a parameter matrix containing learned weights, and $b^{utt}$ denotes a learned bias value.

Scoring model 200 may further include a context scorer stage 260 that generates a context score 265 based on encoded representations 242, 245, and 246. FIG. 2C depicts an illustrative embodiment of context scoring stage 260. As depicted in FIG. 2C, context scoring stage 260 may include an attention layer 292 that generates an attended representation 294 based on encoded representations 242, 245, and 246. In particular, attended representation 294 may be generated by attending over a representation of the context (e.g., encoded representation 246) using a representation of the user communication (e.g., encoded representation 245). For example, attended representation 294 may be determined by evaluating the following equation:

$$q^{ctx} = \sum_i p_i^{ctx} c_i^{ctx}$$

Where $q^{ctx}$ denotes attended representation 284; $c_i^{ctx}$ denotes the ith value of encoded representation 246; $p_i^{ctx}$ is defined as softmax($s^{ctx}$); the ith value of $s^{ctx}$ is defined as $s_i^{ctx} = c_i^{ctx} \cdot c_j^{utt}$; and $c_j^{utt}$ denotes the jth value of encoded representation 245.

Context scoring stage 260 may further include a multiplication layer 296 that generates context score 265 based on attended representation 294. For example, context score 265 may be determined by evaluating the following equation:

$$y^{ctx} = q^{ctx} \cdot c^{val}$$

Where $y^{ctx}$ denotes context score 265 and $c^{val}$ denotes encoded representation 242.

Returning to FIG. 2A, scoring model 200 may further include a score combiner stage 270 that determines member score 208 based on a combination of user communication score 255 and context score 265. In illustrative embodiments, member score 208 may be determined by evaluating the following equation $$y = \sigma(y^{utt} + w_y y^{ctx})$$

Where y denotes member score 208, σ denotes a sigmoid function, and $w_y$ denotes a learned weighting parameter.

According to some embodiments, scoring model 200 may correspond to a computational graph, in which case various stages (e.g., input stages 212-216, encoder stages 232-236, scoring stages 250 and/or 260, and/or score combiner stage 270) may correspond to collections of nodes in the computational graph. Consistent with such embodiments, various representations used by scoring model 200 (e.g., input representations 222-226, encoded representations 242-246, and/or any intermediate representations used by scoring model 200) may correspond to real-valued tensors (e.g., scalars, vectors, multidimensional arrays, and/or the like) that are passed along edges of the computational graph. Moreover, each node of the computation graph may perform one or more tensor operations, e.g., transforming one or more input representations of the node into one or more output representations of the node. Examples of tensor operations performed at various nodes may include matrix multiplication, n-dimensional convolution, normalization, element-wise operations, and/or the like.

Figure 3:
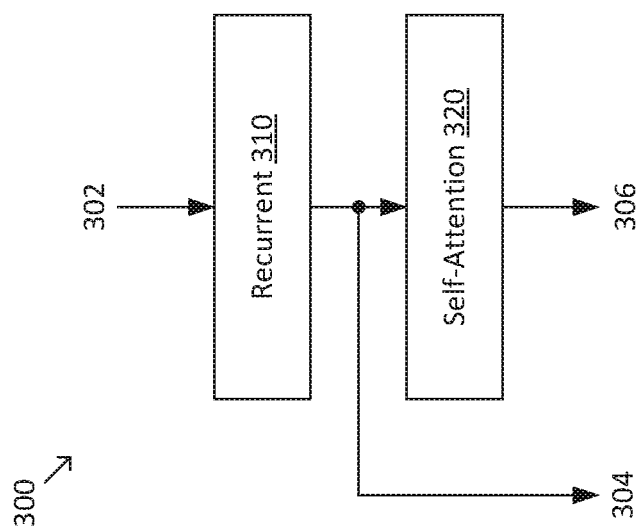
FIG. 3 is a simplified diagram of an encoder according to some embodiments.

FIG. 3 is a simplified diagram of an encoder 300 according to some embodiments. According to some embodiments consistent with FIGS. 1A-2C, encoder 300 may be used to implement one or more of encoder stages 232-236. Consistent with such embodiments, encoder 300 may receive an input representation 302 and generate one or more encoded representations 304 and/or 306. In embodiments consistent with FIGS. 1A-2C, input representation 302 may generally correspond to any of input representations 222-226, encoded representation 304 may generally correspond to encoded representation 244, and encoded representation 306 may generally correspond to any of encoded representations 242, 245, and/or 246.

In some embodiments, encoder 300 may include a recurrent neural network (RNN) layer 310 that receives input representation 302 and generates encoded representation 304. In general, an RNN layer injects sequence-related information (e.g., temporal information) into the transformed representation. For example, the RNN layer may include a sequence of simple RNN cells, long short-term memory (LSTM) cells, gated recurrent units (GRUs), and/or the like. In some examples, RNN layer 310 may be bi-directional, e.g., a bi-directional LSTM (Bi-LSTM) layer. For example, when RNN layer 310 includes a Bi-LSTM layer, encoded representation 304 may include a set of intermediate LSTM states.

In some embodiments, encoder 300 may include a self-attention layer 320 that receives encoded representation 304 and generates encoded representation 306. In particular, encoded representation 306 may be generated by self-attending over encoded representation 304. For example, encoded representation 306 may be determined by evaluating the following equation:

$$c = \sum_i p_i H_i$$

Where c denotes encoded representation 306; $H_i$ denotes the ith value of encoded representation 304; $p_i$ is defined as softmax(s); the ith value of s is defined as $s_i = WH_i + b$; W denotes a parameter matrix containing learned weights; and b denotes a learned bias.

In some embodiments, encoder 300 may include local trained parameters that are determined separately for each ontology member of an ontology set, such as ontology set 140. The use of local trained parameters may improve the accuracy of encoder 300 by separately tuning the trained parameters for each ontology member in the ontology set.

One challenge associated with local trained parameters is that the use of local trained parameters limits the number of training examples in which the corresponding ontology member occurs. The challenge is particularly exacerbated for ontology members that occur rarely in practice (e.g., users may rarely request to eat at expensive restaurants, meaning training data sets tend to include very few examples in which a user communication expresses such a request). Large ontology sets are also likely to include a large number of ontology members, each of which is individually unlikely to occur in a given turn, but at least one of which is collectively likely to occur in a given turn. For example, a travel reservation system may be configured to handle requests for vast number of potential travel destinations around the world. Accordingly, the likelihood that a user's request identifies at least one destination is high, but the likelihood that the requested destination is a particular destination (e.g., "Paris, France") among all possible destinations is low. The problem may be quantified with reference to particular training data sets. For example, in the WoZ state tracking data set, although each slot-value pair occurs in 214.9 training examples on average, the set includes a number of rare slot-value pairs exist that occur in less than 20 training examples. Moreover, although such rare slot-value pairs are individually uncommon, they collectively occur frequently: 38.6% of turns in the WoZ dataset have a goal that contains a rare (fewer than 20 training examples) slot-value pair.

To address this challenge, encoder 300 may include global trained parameters that are shared among the ontology members of the ontology set. The use of global trained parameters may improve the performance of encoder 300, particularly with respect to rarely occurring ontology members, by expanding the scope of the training process to the full ontology set. However, overall accuracy may decline when using global trained parameters, as the global trained parameters are not tuned to particular ontology members.

Figure 4:
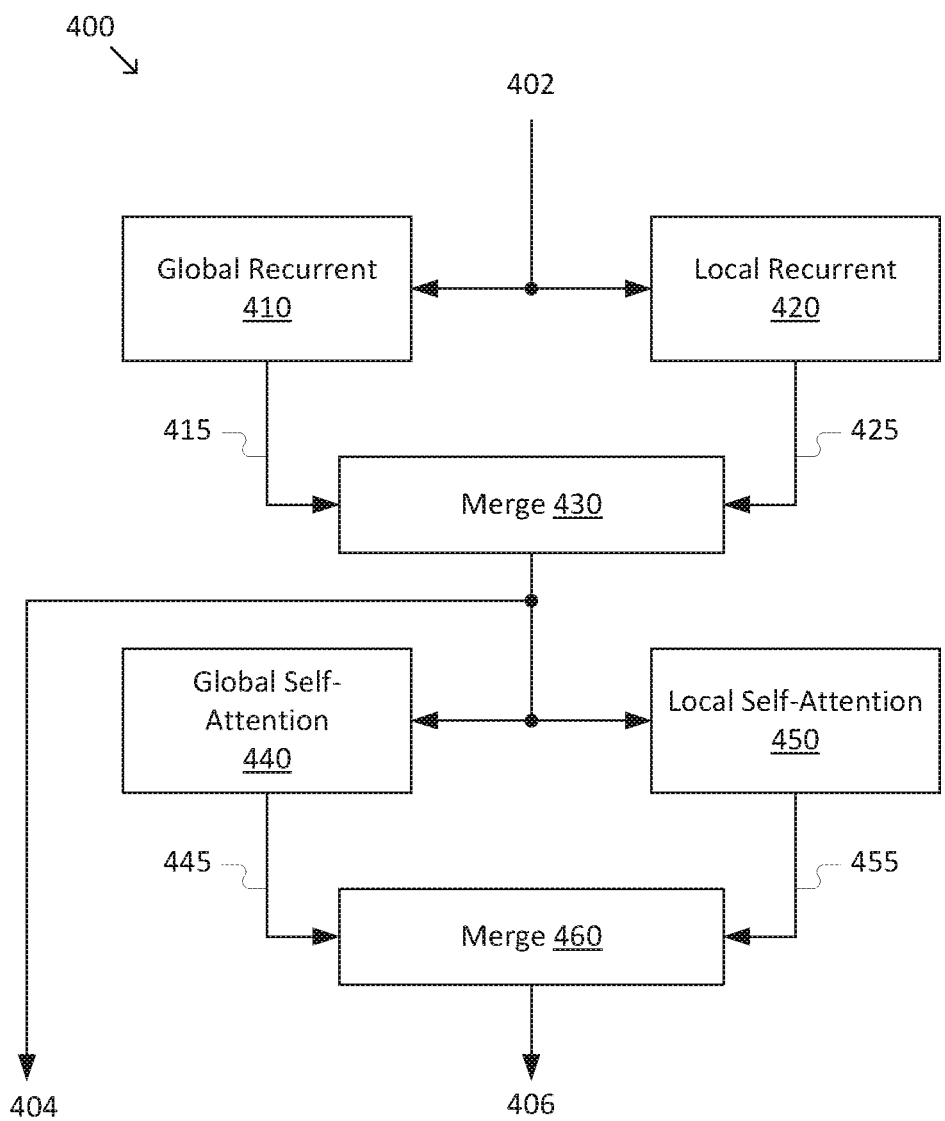
FIG. 4 is a simplified diagram of a global-local encoder according to some embodiments.

FIG. 4 is a simplified diagram of a global-local encoder 400 according to some embodiments. Relative to encoder 300, global-local encoder 400 may be used to train scoring model 200 with a combination of local trained parameters and global trained parameters. Accordingly, global-local encoder 400 may harness the benefits of both local trained parameters (e.g., improved accuracy for frequently occurring ontology members for which a large number of training examples are available) and global trained parameters (e.g., improved accuracy for rarely occurring ontology members for which few training examples are available).

According to some embodiments consistent with FIGS. 1A-2C, global-local encoder 400 may be used to implement one or more of encoder stages 232-236. Consistent with such embodiments, global-local encoder 400 may receive an input representation 402 and generate one or more encoded representations 404 and/or 406. In embodiments consistent with FIGS. 1A-2C, input representation 402 may generally correspond to any of input representations 222-226, encoded representation 404 may generally correspond to encoded representation 244, and encoded representation 406 may generally correspond to any of encoded representations 242, 245, and/or 246. It is to be understood, however, that global-local encoder 400 may be generally used in a wide variety of models other than scoring model 200, e.g., scoring models with different architectures than that of scoring model 200.

In some embodiments, global-local encoder 400 may include one or more global branches (e.g., branches that include global trained parameters that are shared among the plurality of ontology members) and one or more local branches (e.g., branches that include local trained parameters that are determined separately for each of the plurality of ontology members). In some embodiments, a given global branch may be arranged in parallel with a corresponding local branch. For example, as depicted in FIG. 4, global-local encoder 400 includes a first global branch that includes a global recurrent neural network (RNN) layer 41, and a first local branch that includes a local RNN layer 420, where the first global branch and the first local branch are arranged in parallel. Global RNN layer 410 receives input representation 402 and generates a global encoded representation 415, and local RNN layer 420 receives input representation 402 and generates a local encoded representation 425. Whereas global RNN layer 410 may include global trained parameters that are shared among the ontology members of the ontology set, local RNN layer 420 may include local trained parameters that are determined separately for each ontology member of the ontology set. As previously discussed, an RNN layer injects sequence-related information (e.g., temporal information) into the transformed representation. For example, the RNN layer may include a sequence of simple RNN cells, long short-term memory (LSTM) cells, gated recurrent units (GRUs), and/or the like. In some examples, RNN layers 410 and/or 420 may be bi-directional, e.g., a bi-directional LSTM (Bi-LSTM) layer. For example, when RNN layers 410 and/or 420 include a Bi-LSTM layer, encoded representations 415 and/or 425 may include a set of intermediate LSTM states.

Global-local encoder 400 may include a merge module 430 to combine global encoded representation 415 and local encoded representation 425 and generate encoded representation 404. In some embodiments, merge module 430 may include local trained parameters that are determined separately for each ontology member of the ontology set, global trained parameters that are shared among the ontology members of the ontology set, and/or any suitable combination thereof. In illustrative embodiments, encoded representation 404 may correspond to a weighted average of global encoded representation 415 and local encoded representation 425 with a local weighting parameter, which may be determined by evaluating the following equation:

$$f'(x) = \sigma(\alpha_s) f_s(x) + (1 - \sigma(\alpha_s)) f_g(x)$$

Where x denotes input representation 402; $f'(x)$ denotes encoded representation 404; $f_s(x)$ denotes local encoded representation 425; $f_g(x)$ denotes global encoded representation 415; $\sigma$ denotes a sigmoid function; and $\alpha_s$ denotes a learned, local weighting parameter that is determined for a given ontology member s.

In some embodiments, global-local encoder 400 may include a second global branch that includes a global self-attention layer 440 and a second local branch that includes a local self-attention layer 450, where the second global branch and the second local branch are arranged in parallel. Global self-attention layer 440 receives encoded representation 404 and generates a global encoded representation 445, and local self-attention layer 450 receives encoded representation 404 and generates a local encoded representation 455. As previously discussed with respect to FIG. 3, global encoded representation 445 and/or local encoded representation 455 may be generated by self-attending over encoded representation 404. For example, global encoded representation 445 (or local encoded representation 455) may be determined by evaluating the following equation:

$$c = \sum_i p_i H_i$$

Where c denotes global encoded representation 445 (or local encoded representation 455); $H_i$ denotes the ith value of encoded representation 404; $p_i$ is defined as softmax(s); the ith value of s is defined as $s_i$=$WH_i$+b; W denotes a parameter matrix containing learned weights; and b denotes a learned bias. In the case of global self-attention layer 440, the learned weights and/or the learned bias may be global trained parameters that are shared among the ontology members of the ontology set. In the case of local self-attention layer 450, the learned weights and/or the learned bias may be local trained parameters that are determined separately for each ontology member of the ontology set.

Global-local encoder 400 may include a merge module 460 to combine global encoded representation 445 and local encoded representation 455 and generate encoded representation 406. In general, merge module 460 may operate in a manner similar to merge module 430. For example, encoded representation 406 may correspond to a weighted average of global encoded representation 445 and local encoded representation 455 with a local weighting parameter, which may be determined by evaluating the following equation:

$$f'(x) = \sigma(\alpha_s) f_s(x) + (1-\sigma(\alpha_s)) f_g(x)$$

Where x denotes encoded representation 404; f'(x) denotes encoded representation 406; $f_s(x)$ denotes local encoded representation 455; $f_g(x)$ denotes global encoded representation 445; σ denotes a sigmoid function; and $\alpha_s$ denotes a learned, local weighting parameter for a given ontology member s.

Figure 5:
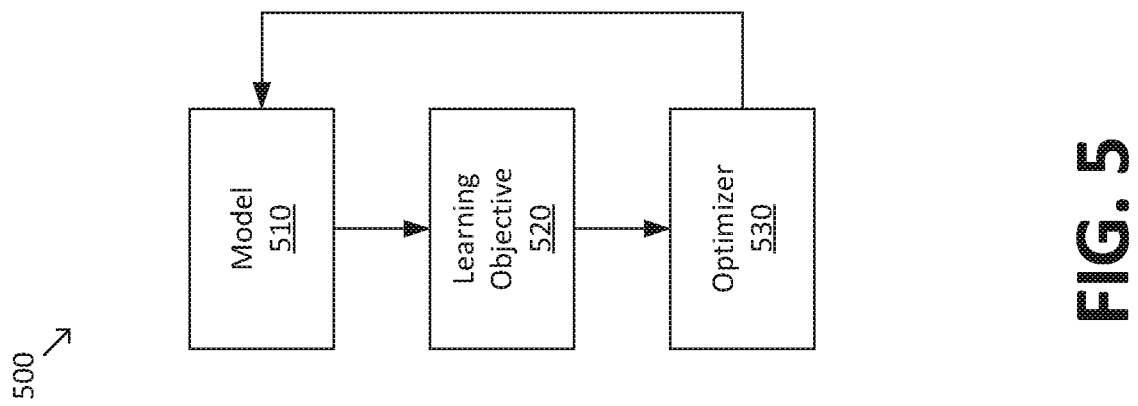
FIG. 5 is a simplified diagram of a training configuration for a neural network model according to some embodiments.

FIG. 5 is a simplified diagram of a training configuration 500 for a neural network model according to some embodiments. As depicted in FIG. 5, training configuration 500 is used to train a model 510. In some embodiments consistent with FIGS. 1-4, model 510 may be used to implement scoring model 200.

According to some embodiments, training configuration 500 may be used to train a plurality of model parameters of model 510. During training, a large number of training examples (e.g., user communication sequences, context sequences, and/or ontology member sequences) are provided to model 510. The predicted member scores generated by model 510 are compared to a ground truth answers for each of the examples using a learning objective 520, which determines a loss and/or reward associated with a given predicted member score based on the ground truth answer.

The output of learning objective 520 (e.g., the loss and/or reward) is provided to an optimizer 530 to update the model parameters of model 510. For example, optimizer 530 may determine the gradient of the objective with respect to the model parameters and adjust the model parameters using back propagation. In some embodiments, optimizer 530 may include a gradient descent optimizer (e.g., stochastic gradient descent (SGD) optimizer), an ADAM optimizer, an Adagrad optimizer, an RMSprop optimizer, and/or the like. Various parameters may be supplied to optimizer 530 (e.g., a learning rate, a decay parameter, and/or the like) depending on the type of optimizer used.

Figure 6:
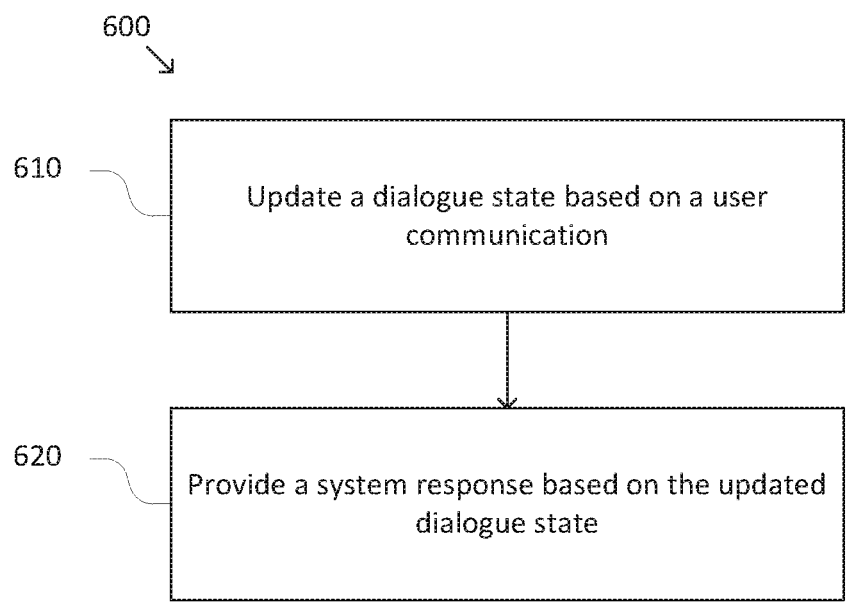
FIG. 6 is a simplified diagram of a method for maintaining a dialogue state associated with a dialogue between a user and a digital system according to some embodiments.

FIG. 6 is a simplified diagram of a method 600 for maintaining a dialogue state associated with a dialogue between a user and a digital system, such as digital system 100, according to some embodiments. According to some embodiments consistent with FIGS. 1-5, all or portions of method 600 may be performed using a processor, such as processor 122. In some embodiments, all or portions of method 600 may be performed by evaluating a neural network model, such as scoring models 150 and/or 200.

At a process 610, a dialogue state, such as dialogue state 132, is updated based on a user communication (or a digital representation thereof, the representation having been received, e.g., from a user device). In some embodiments, the dialogue state may be updated using a dialogue state tracker associated with the digital system, such as dialogue state tracker 130. Consistent with such embodiments, the dialogue state tracker may evaluate a scoring model, such as scoring model 150, to determine a plurality of member scores corresponding to a plurality of ontology members of an ontology set, such as ontology set 140. In some embodiments, the scoring model may generate each of the member scores based on the user communication, the ontology member under consideration, and/or contextual information, such as context 134. Based on the member scores, the dialogue state tracker may update the dialogue state. For example, the dialogue state tracker may select zero or more ontology members to add to or remove from the dialogue state based on the member scores (e.g., by selecting ontology members with member scores that exceed or fall below a predetermined threshold value). In some embodiments, the dialogue state may include cumulative goals (e.g., a set of goals expressed by the user up to the current exchange in the dialogue) and/or turn requests (e.g., a set of requests expressed by the user during the current exchange).

At a process 620, a system response is provided based on the updated dialogue state. In some embodiments, the system response may be provided using a response module, such as response module 160. In some embodiments, the system response may include performing a task on behalf of the user (e.g., searching a database, making a restaurant reservation, and/or the like), providing a response dialogue to the user, requesting additional information from the user, and/or the like. In some embodiments, the response module may record one or more actions taken at process 620, e.g., by updating the contextual information. Accordingly, when method 600 is repeated during subsequent exchanges of a dialogue with the user, the dialogue state tracker may access the updated contextual information when updating the dialogue state.

Figure 7:
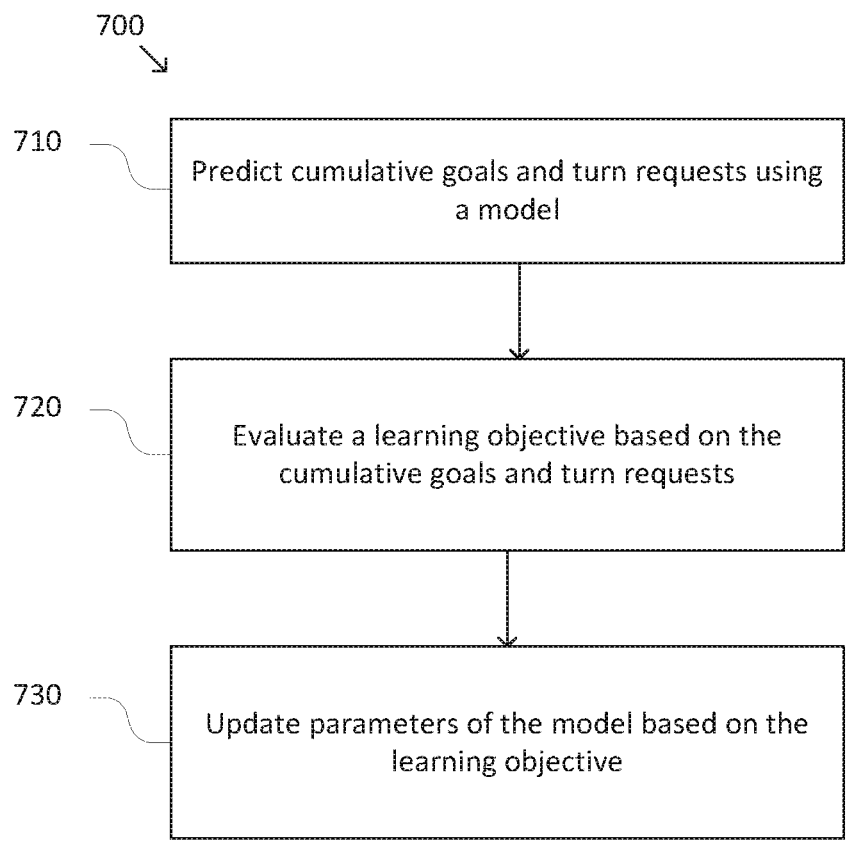
FIG. 7 is a simplified diagram of a method for training a neural network model according to some embodiments.

FIG. 7 is a simplified diagram of a method 700 for training a neural network model according to some embodiments. According to some embodiments consistent with FIGS. 1-6, method 700 may be used to train a neural network model, such as scoring models 150 and/or 200. During training, the model may be configured in a training configuration, such as training configuration 500. In some examples, method 700 may be performed iteratively over a large number of training examples to gradually train the neural network model.

At a process 710, cumulative goals and/or turn requests are predicted using the neural network model. In some embodiments, the cumulative goals and/or turn requests may be generated based on a training example that includes a training communication. In some embodiments, the cumulative goals and/or turn requests may be generated according to method 600.

At a process 720, a learning objective is evaluated based on the cumulative goals and/or turn requests. In some embodiments, the learning objective may correspond to learning objective 520. In some embodiments, the learning objective may be evaluated by comparing the cumulative goals and/or turn requests predicted at process 710 to a ground truth answer corresponding to the training communication.

At a process 730, the parameters of the neural network model are updated based on the learning objective. In some embodiments, the model parameters may be updated using an optimizer, such as optimizer 530. In some embodiments, the parameters may be updated by determining a gradient of the learning objective with respect to the model parameters and updating the parameters based on the gradient. The gradient of the learning objective may be determined by back propagation.

FIGS. 8A and 8B are simplified diagrams of an experimental evaluation of a dialogue state tracker according to some embodiments. The dialogue state tracker being evaluated includes a scoring model, configured as depicted in FIG. 3, and different versions of the dialogue state tracker are trained on the WoZ and DSTC2 data sets.

FIG. 8A depicts a table 810 that compares the accuracy of a dialogue state tracker of the present disclosure (last row) to the accuracy of other types of dialogue state trackers (other rows). As indicated in the table, the dialogue state tracker of the present disclosure achieves the highest accuracy across all metrics, including 74.8% cumulative goal accuracy and 97.3% turn request accuracy on the DSTC2 data set and 88.3% cumulative goal accuracy and 96.4% turn request accuracy on the WoZ data set.

FIG. 8B depicts a table 820 that includes the results of an ablation study of a dialogue state tracker of the present disclosure, trained and tested on the WoZ data set. The top row corresponds to a dialogue state tracker with a global-local encoder configured as depicted in FIG. 4, using a combination of global and local trained parameters. The second row corresponds to a dialogue state tracker with an encoder configured as depicted in FIG. 3, using local trained parameters. The second row corresponds to a dialogue state tracker with an encoder configured as depicted in FIG. 3, using global trained parameters. The third row corresponds to a dialogue state tracker with a global-local encoder configured as depicted in FIG. 4, but without self-attention layers (e.g., without global self-attention layer 440 and/or local self-attention layer 450). The third row corresponds to a dialogue state tracker with a global-local encoder configured as depicted in FIG. 4, but without recurrent layers (e.g., without global RNN layer 410 and/or local RNN layer 420). As indicated in the table, removing the various features results in a decrease of between 1.2% and 17.3% in cumulative goal accuracy and a decrease of between 0% and 4.1% in turn request accuracy.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications. Thus, the scope of the present application should be limited only by the following claims, and it is appropriate that the claims be construed broadly and in a manner consistent with the scope of the embodiments disclosed herein.

What is claimed is:

1. A system for training a scoring model in a digital system, the system comprising:
   a global-local encoder stored in memory and configured to execute on a processor, the global-local encoder comprising:
   a global recurrent neural network in a global branch, the global recurrent neural network trained using global parameters and configured to receive an input representation and generate a first global encoded representation;
   a local recurrent neural network in a local branch, the local recurrent neural network trained using local parameters and configured to receive the input representation and generate a first local encoded representation;
   a first merge module configured to receive the first global encoded representation and the first local encoded representation and generate a first merged encoded representation;
   a global self-attention layer in the global branch, the global self-attention layer configured to receive the first merged encoded representation and generate a second global encoded representation;
   a local self-attention layer in the local branch, the local self-attention layer configured to receive the first merged encoded representation and generate a second local encoded representation; and
   a second merge module configured to receive the second global encoded representation and the second local encoded representation and generate a second merged encoded representation; and
   the scoring model configured to be trained using the second merged encoded representation, wherein the trained scoring model is configured to select at least one action taken by the digital system in response to a user communication.

2. The system of claim 1, wherein the global recurrent neural network is configured to generate the first global encoded representation in parallel with the local recurrent neural network that is configured to generate the first local encoded representation.

3. The system of claim 1, wherein the global parameters are shared among a plurality of ontology members.

4. The system of claim 1, wherein a local parameter in the local parameters for an ontology member in a plurality of ontology members is determined separately from other local parameters in the local parameters for other ontology members in the plurality of ontology members.

5. The system of claim 1, wherein the first merge module is trained on the global parameters, the local parameters, or a combination of at least some of the global parameters and at least some of the local parameters.

6. The system of claim 1, wherein the global self-attention layer is configured to generate the second global encoded representation in parallel with the local self-attention layer that is configured to generate the second local encoded representation.

7. The system of claim 1, wherein the second merge module is configured to generate the second merged encoded representation by weighing the second global encoded representation and the second local encoded representation with a local weighing parameter.

8. A system for training a scoring model in a digital system, the system comprising:
a global-local encoder stored in memory and configured to execute on a processor, the global-local encoder comprising:
a global branch comprising at least one neural network trained using global parameters, the global branch configured to receive an input representation and generate a global encoded representation, wherein the at least one neural network includes a global self-attention neural network configured to generate a global self-attention encoded representation;
a local branch comprising at least one second neural network trained using local parameters, the local branch configured to receive the input representation and generate a local encoded representation, the at least one second neural network includes a local self-attention neural network configured to generate a local self-attention encoded representation, and wherein the global self-attention encoded representation and the local self-attention encoded representation are configured to be generated in parallel; and
a merge module configured to receive the global encoded representation and the local encoded representation and generate a merged encoded representation; and
the scoring model configured to be trained using the merged encoded representation, wherein the trained scoring model is configured to select at least one action taken by the digital system in response to a user communication.

9. The system of claim 8, wherein the at least one neural network in the global branch further comprises a global recurrent neural network (RNN) configured to generate a global RNN encoded representation in the global encoded representation.

10. The system of claim 8, wherein the at least one second neural network in the local branch further comprises a local recurrent neural network (RNN) configured to generate a local RNN encoded representation in the local encoded representation.

11. The system of claim 8, wherein the at least one neural network in the global branch is configured to process the input representation in parallel with the at least one second neural network in the local branch.

12. The system of claim 8, wherein the merge module is further configured to apply at least one weight parameter to the global encoded representation and the local encoded representation to generate the merged encoded representation.

13. The system of claim 8, wherein the global self-attention neural network is configured to generate the global self-attention encoded representation using a parameter matrix that includes learned weights.

14. The system of claim 8, wherein the local self-attention neural network is configured to generate the local self-attention encoded representation using a parameter matrix that includes learned weights.

15. A method for training a scoring model in a digital system, the method comprising:
generating, using a first self-attention neural network in a global branch of a global-local encoder stored in memory, a global encoded representation from an input representation, wherein the first self-attention neural network is trained using global parameters;
generating, using a second self-attention neural network in a local branch of the global-local encoder, a local encoded representation from the input representation, wherein the second self-attention neural network is trained using local parameters, and wherein the global encoded representation and the local encoded representation are generated in parallel;
merging, in the global-local encoder, the global encoded representation and the local encoded representation to generate a merged encoded representation; and
training the scoring model using the merged encoded representation, wherein the trained scoring model is configured to select at least one action taken by the digital system in response to a user communication.

16. The method of claim 15, further comprising:
generating, using a global recurrent neural network (RNN) in the global branch, a RNN global encoded representation.

17. The method of claim 15, further comprising:
generating, using a local recurrent neural network (RNN) in the local branch, a RNN local encoded representation.

18. The method of claim 15, wherein the merging further comprises:
applying at least one weight parameter to the global encoded representation and the local encoded representation to generate the merged encoded representation.

19. The method of claim 15, further comprising:
training the global-local encoder to merge the global encoded representation and the local encoded representation using the global parameters, the local parameters, or a combination of at least some of the global parameters and at least some of the local parameters.

20. The method of claim 15, wherein the merging further comprises:
applying at least one weight parameter to the global encoded representation and the local encoded representation to generate the merged encoded representation.

* * * * *